US008275417B2

(12) United States Patent  (10) Patent No.: US 8,275,417 B2
Flynn  (45) Date of Patent: Sep. 25, 2012

(54) FLOOD EVACUATION SYSTEM FOR SUBTERRANEAN TELECOMMUNICATIONS VAULT

(75) Inventor: Michael Patrick Flynn, Coto De Caza, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 2166 days.

(21) Appl. No.: 10/880,423

(22) Filed: Jun. 28, 2004

(65) Prior Publication Data

US 2005/0130621 A1  Jun. 16, 2005

Related U.S. Application Data

(60) Provisional application No. 60/483,332, filed on Jun. 27, 2003.

(51) Int. Cl.
*H04M 1/00* (2006.01)

(52) U.S. Cl. ........ 455/561; 220/484; 361/724; 385/134; 385/135

(58) Field of Classification Search .................. 455/561; 220/484; 361/724; 385/134, 135
See application file for complete search history.

(56) References Cited

U.S. PATENT DOCUMENTS

| | | | |
|---|---|---|---|
| 2,247,936 A * | 7/1941 | Bishop | 174/17 R |
| 2,885,600 A | 11/1957 | Wiseman | |
| 2,932,953 A | 4/1960 | Becket et al. | |
| 3,345,449 A | 10/1967 | S. Hiller | |
| 3,581,918 A | 6/1971 | Fujioka | |
| 3,944,309 A | 3/1976 | Taniwaki | |
| 4,119,376 A | 10/1978 | Moyer | |
| 4,222,341 A * | 9/1980 | Larsen et al. | 114/264 |
| 4,449,579 A | 5/1984 | Miyazaki et al. | |
| 4,693,418 A | 9/1987 | Peterman | |
| 4,694,484 A | 9/1987 | Atkinson et al. | |
| 4,913,238 A * | 4/1990 | Danazcko et al. | 405/223.1 |
| 5,004,304 A | 4/1991 | Segerpalm et al. | |
| 5,069,592 A | 12/1991 | Galperin | |
| 5,190,452 A | 3/1993 | Katchka et al. | |
| 5,417,486 A | 5/1995 | Manlove | |
| 5,564,280 A | 10/1996 | Schilling et al. | |
| 5,653,070 A | 8/1997 | Seguin | |
| 5,657,587 A * | 8/1997 | Gefroh | 52/107 |
| 5,801,632 A | 9/1998 | Opal | |
| 5,925,848 A * | 7/1999 | Elliott, Jr. | 174/38 |
| 5,999,403 A | 12/1999 | Neustadt | |
| 6,082,845 A * | 7/2000 | Eizadkhah et al. | 312/323 |
| 6,158,601 A | 12/2000 | Baker et al. | |
| 6,164,369 A | 12/2000 | Stoller | |
| 6,182,677 B1 | 2/2001 | Pignataro | |
| 6,227,397 B1 | 5/2001 | Kim | |
| 6,238,029 B1 | 5/2001 | Marzec et al. | |
| 6,256,505 B1 | 7/2001 | Kingdon et al. | |
| 6,262,894 B1 | 7/2001 | Nelson et al. | |
| 6,304,441 B1 | 10/2001 | Han | |
| 6,339,372 B1 | 1/2002 | Warnock et al. | |
| 6,411,825 B1 | 6/2002 | Csapo et al. | |
| 6,416,143 B1 | 7/2002 | Janson | |
| 6,425,707 B1 * | 7/2002 | Baxter | 405/87 |
| 6,462,949 B1 | 10/2002 | Parish et al. | |

(Continued)

*Primary Examiner* — Lester Kincaid
*Assistant Examiner* — Mehmood B Khan
(74) *Attorney, Agent, or Firm* — OC Patent Law Group

(57) ABSTRACT

An improved vault that facilitates the underground storage of electronic equipment, such as instrumentation for wireless telecommunications antenna systems. The vault preferably includes an flood evacuation system that prevents the electronic equipment from being submerged under water when the vault floods, a break-away lid to reduce or minimize injury, and a grated lid to prevent water from entering the main equipment chamber.

44 Claims, 10 Drawing Sheets

U.S. PATENT DOCUMENTS

| | | | |
|---|---|---|---|
| 6,513,342 B1 * | 2/2003 | Flynn | 62/259.2 |
| 6,681,702 B1 | 1/2004 | Nicely | |
| 7,101,114 B1 * | 9/2006 | Waters, Jr. | 405/41 |
| 7,149,546 B1 * | 12/2006 | Hollen | 455/561 |
| 2001/0052412 A1 | 12/2001 | Tikka | |

* cited by examiner

FLOOD EVACUATION SYSTEM FOR SUBTERRANEAN TELECOMMUNICATIONS VAULT

CROSS-REFERENCE TO RELATED APPLICATION

This application claims the benefit of U.S. Provisional Application No. 60/483,332, filed Jun. 27, 2003, which application is incorporated herein by reference.

FIELD OF THE INVENTION

The present invention relates generally to subterranean enclosures for electronic equipment and, more particularly, to a subterranean vault for underground storage of electronic equipment, such as instrumentation for wireless telecommunications transceiver systems, and an evacuation system that protects the equipment against flooding.

BACKGROUND OF THE INVENTION

Public demand for wireless communications has grown at a tremendous rate. An increasing number of people rely on their wireless phones and other devices for an increasing number of uses including voice, messaging, data, video, and internet access. This enormous public demand has in turn fueled the need for additional carrier antenna sites to provide expanded wireless coverage to communities.

As the need for additional antenna sites has grown, so too has the installation restrictions set by many municipalities. Wireless carriers are being required to place their transceiver equipment in an aesthetically pleasing manner. In many municipalities the planning departments are unwilling to grant permit applications for unsightly tower installations. There is also a growing tendency for many of these municipalities to require even the smallest of transceiver circuitry units to be placed underground, and for the antennas to be disguised or stealthed.

The units housing the transceiver or transmitting and receiving circuitry for wireless communications systems come in different sizes, and have different power and transceiver configurations. The standard or "macro-cell" unit is a compact base transceiver station ("BTS"), which stores six (6) to eight (8) transceivers or radios requiring 1800 to 2200 watts of power. The smallest unit currently used, primarily where a mono-pole transceiver system is inappropriate, is a "micro-cell", which typically houses one (1) to two (2) transceivers requiring 170 to 600 watts of power. To meet the restrictions imposed by the municipalities, these macro- and micro-cell units are placed in self contained, sealed subterranean vaults. These may be made of concrete or steel.

The problem with any self-contained, sealed underground vault is that the telecommunications equipment enclosed therein generates heat, which ultimately damages or destroys the equipment. Moisture, either from evaporation or flooding from rain, can also damage or destroy the equipment. These problems are typically solved by using an air conditioner and dehumidifier in conjunction with a water pump. However, in the case of flooding, if the pump is unable to keep up with incoming flow of water, the telecommunications equipment can become submerged in water and ultimately damaged or destroyed.

Thus, it would be desirable to provide the wireless communications industry with a vault to house telecommunications equipment underground that maintains proper climate control for equipment longevity and protects the equipment against flooding.

SUMMARY OF THE INVENTION

The present invention is directed to an improved vault or cabinet for subterranean storage of electronic equipment, such as wireless telecommunications equipment. In a particularly innovative aspect of the invention, the cabinet includes a flood evacuation system that prevents the electronic equipment from becoming submerged as the cabinet floods with water. In a preferred embodiment, the flood evacuation system comprises a float-type member coupled to an equipment rack below the level of the electronic equipment.

In an alternative embodiment, the vault includes a break-away lid releasably coupled to the equipment rack to prevent or minimize injuries in the case of the lid being lowered onto someone's foot or hand. Preferably, the break-away lid is attached to the equipment rack with a spring loaded coupling.

In another alternative embodiment, the vault includes a grated lid or top to control heat management of the vault without having to use external or internal cooling systems. The grated lid allows air to flow into vault vent chambers and out of the main equipment chamber due to a chimney effect to keep electronic equipment housed in the vault at its ambient air temperature. Preferably, the grated lid includes a plurality of elongate vents or slots extending the width of the lid and having a diverter that diverts water into a gutter. The gutter then channels out of the lid.

Other aspects and features of the present invention will become apparent from consideration of the following description taken in conjunction with the accompanying drawings.

DETAILED DESCRIPTION OF PREFERRED EMBODIMENTS

Figure 1:
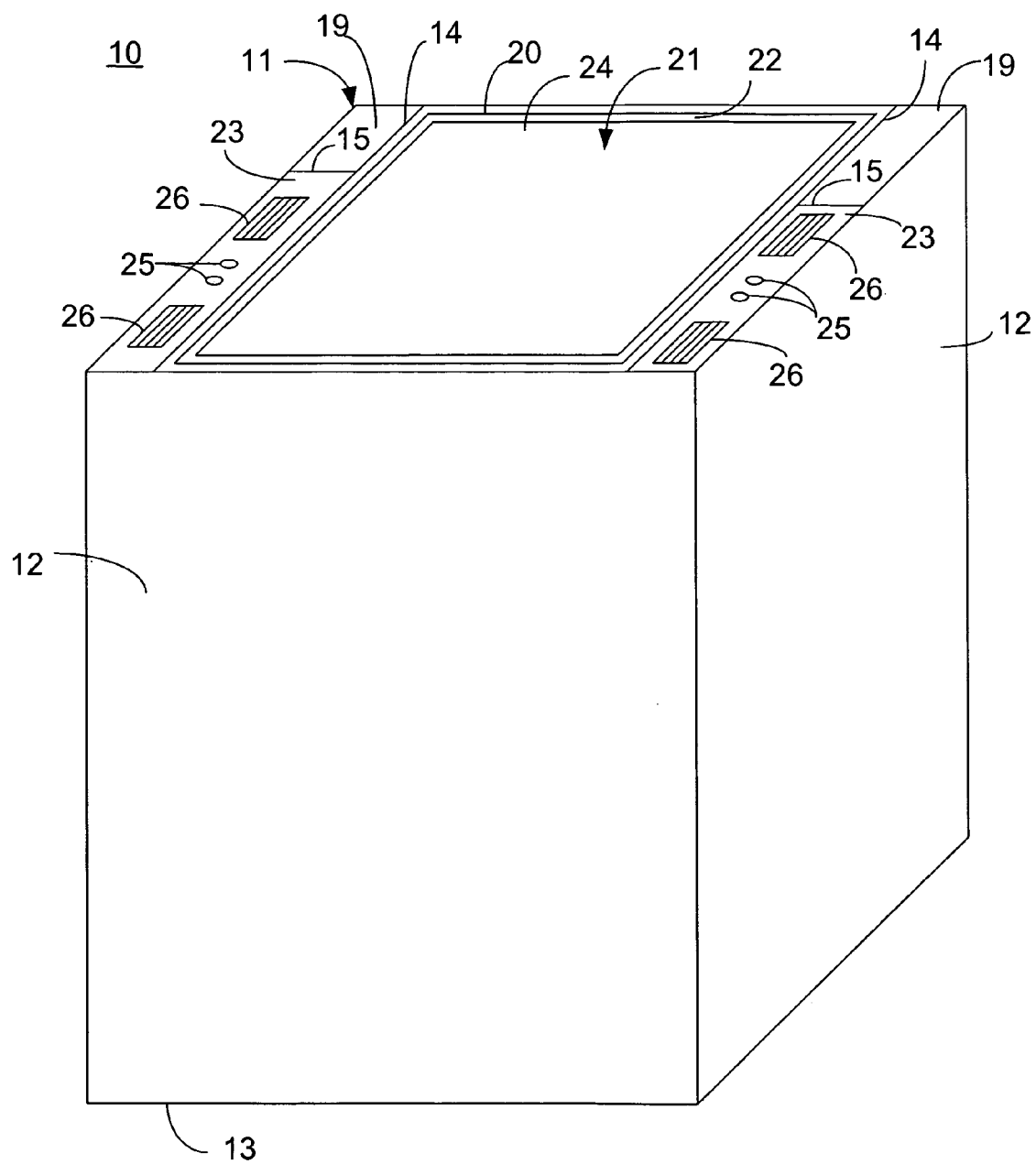
FIG. 1 is an isometric view of a subterranean electronic equipment vault of the present invention.
Figure 2:
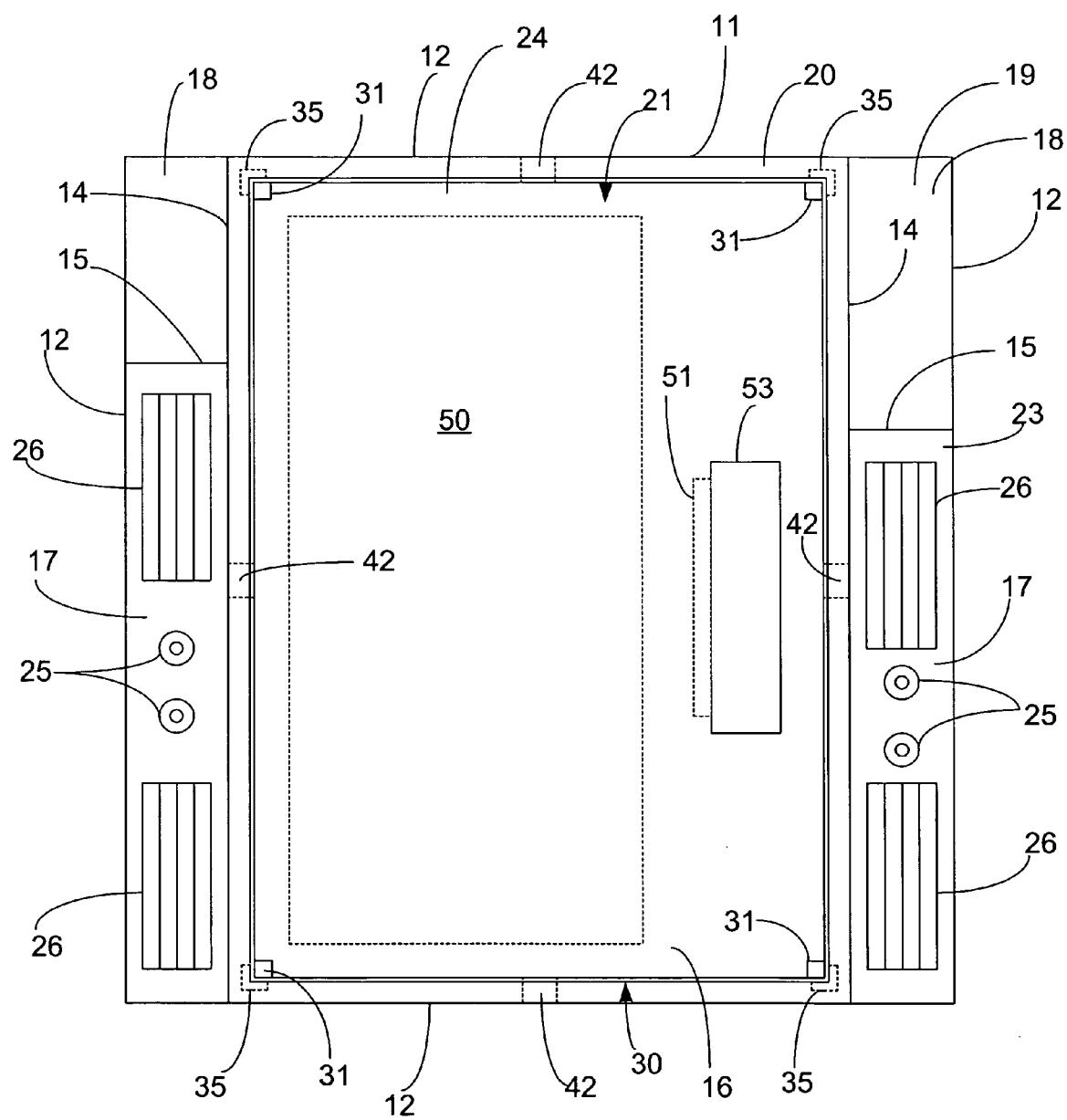
FIG. 2 is a top view of the vault shown in FIG. 1 with the lid gasket removed.
Figure 3:
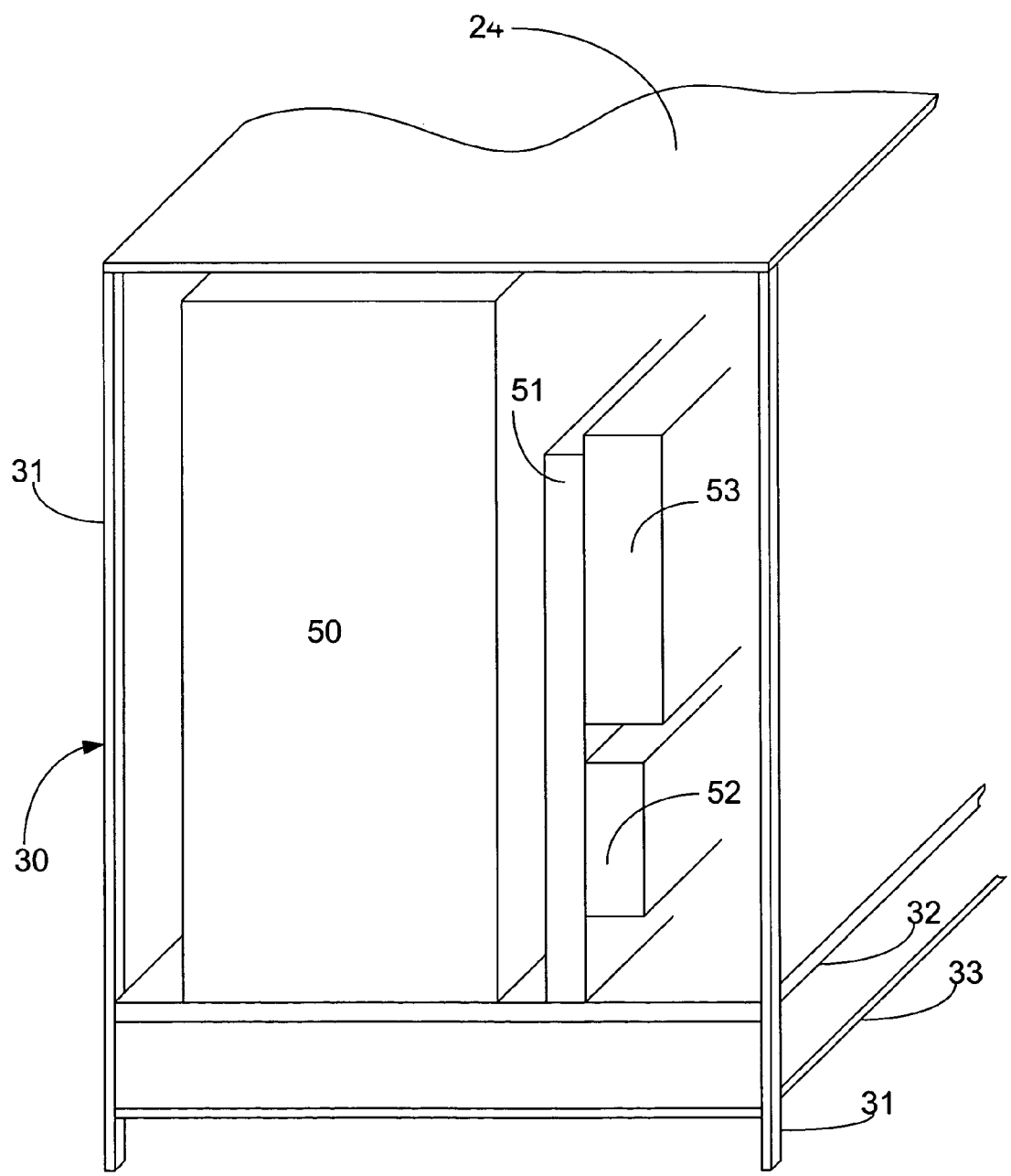
FIG. 3 is a partial isometric view of an equipment rack of the present invention.

Referring in detail to the figures, a cabinet or vault 10 for subterranean storage of electronic equipment is shown. As depicted in FIG. 1, the cabinet 10 includes an enclosure 11 that is preferably formed as a metal weldment. In a preferred embodiment, the enclosure 11 is a stainless steel weldment. Use of a metal, such as stainless steel, advantageously allows the surrounding earth to aid in the dissipation of heat from the vault 10 and, also, advantageously enables the vault 10 to be smaller, without sacrificing strength or equipment security. As a result, the vault 10 can advantageously be placed next to or under vertical structures, such as a light standard, in existing public rights of way.

Alternatively, the enclosure 11 may be formed of reinforced ultra violate inhibitent plastic injection molded material and may be made to any size necessary to accommodate the electronic equipment to be stored.

Figure 4:
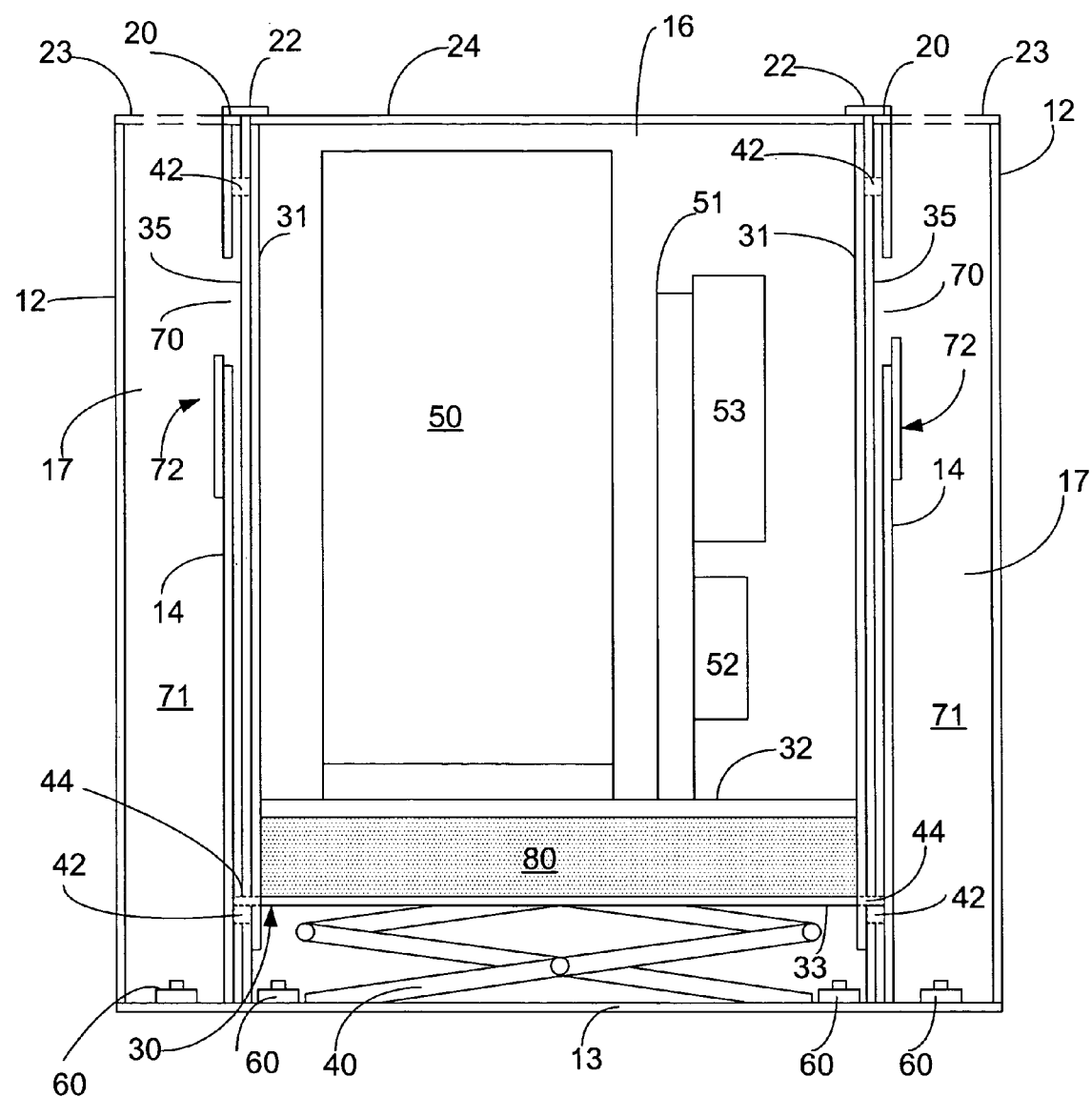
FIG. 4 is a side view of the interior of the vault with the equipment rack in a lowered position.
Figure 5:
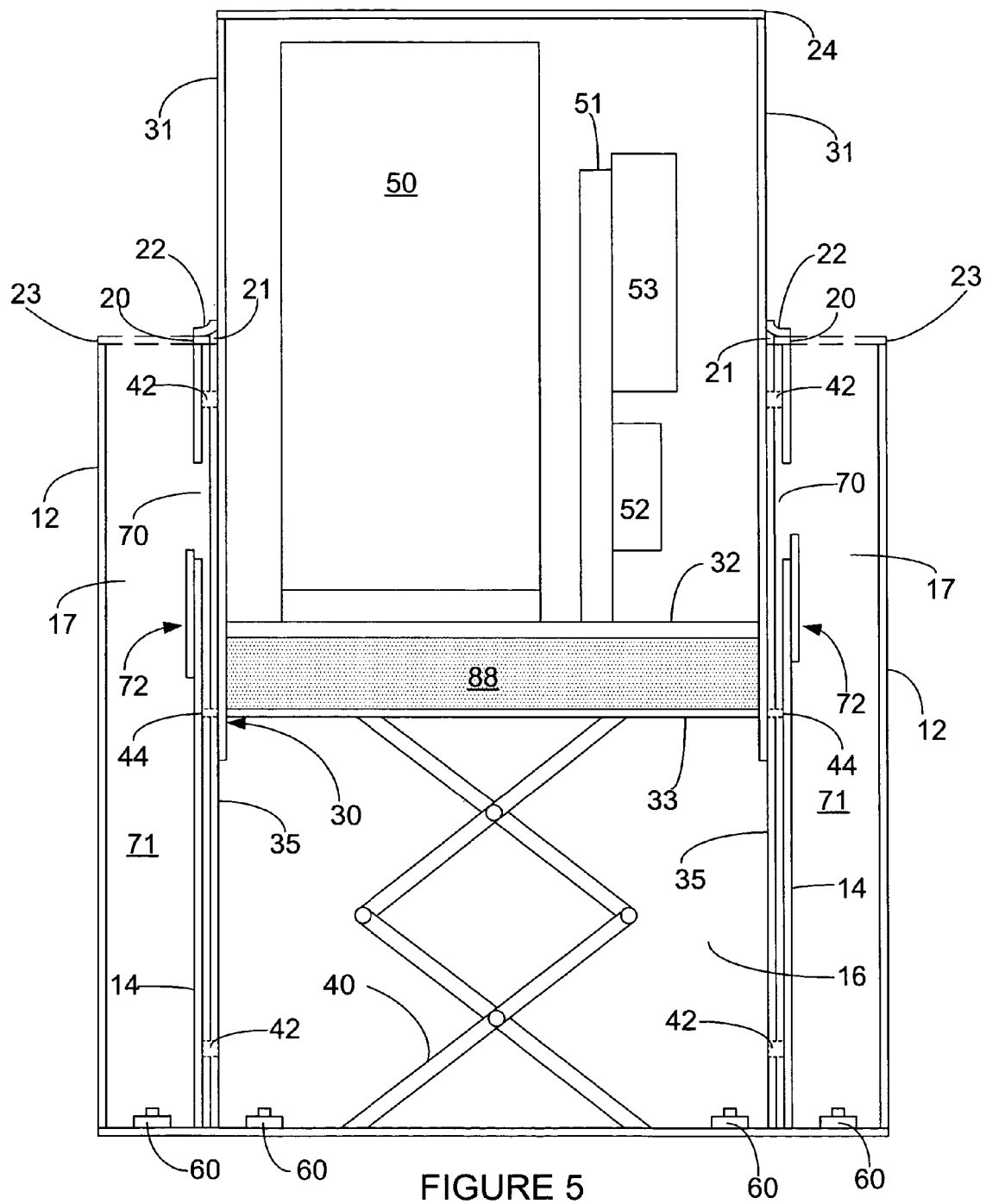
FIG. 5 is a side view of the interior of the vault with the equipment rack in a partially raised position from a partially extended lift mechanism.
Figure 6:
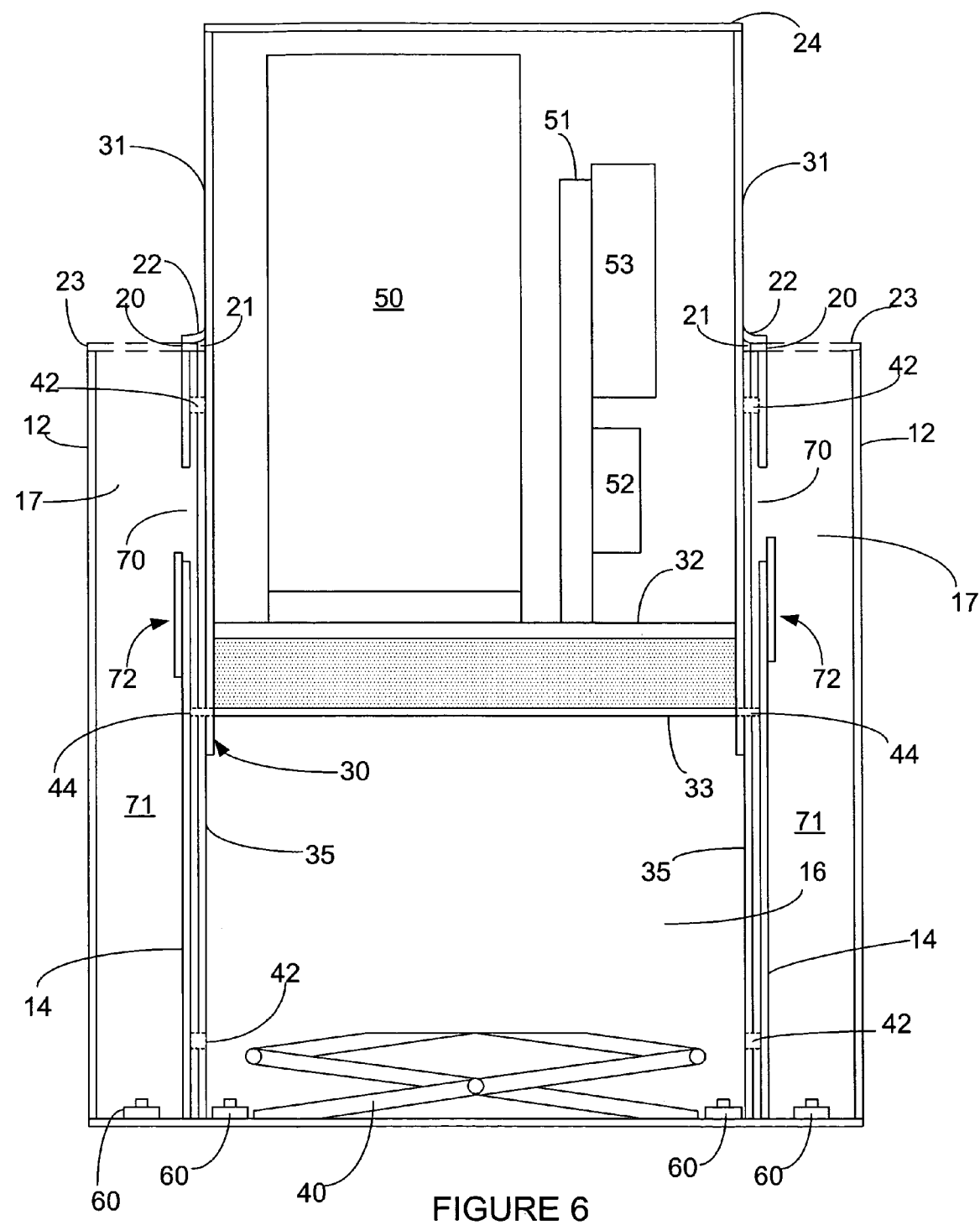
FIG. 6 is a side view of the interior of the vault with the equipment rack in a partially raised position from water rising in the equipment compartment.

The enclosure 11 includes vertical side walls 12 coupled to a bottom plate or base 13. As depicted in FIGS. 4-6, interior walls 14 and 15 divide the interior of the enclosure into a main or radio equipment compartment 16 and vent and other equipment compartments 17 and 18. A top plate 20 (FIG. 1) is coupled to the walls 12 and 14 at the top of the vault 10 and includes an equipment access opening 21 through which telecommunication and other electronic equipment can be loaded into the vault 10 or accessed for repair and maintenance. A lid 24 and rubber gasket 22, which are discussed in greater detail below, seal the access opening 21.

The equipment compartments 18 and vent air compartments 17 include releasably or hingedly coupled covers or lids 19 and 23. The covers 19 and 23 may be opened to provide access to the vent and equipment compartments 17 and 18. The vent compartment lids 23 preferably includes lowered air vents 26 covered with an air permeable mesh, preferably metal, to keep out debris and check valves 25 which are part of a water evacuation system discussed below. The lids 19 and 23 may include a handle (not shown), a releasably lockable hinge or shock absorber-type hinge (not shown) to maintain the lids 19 and 23 in a generally vertical position, a security locking system (not shown), and a magnetic seal similar to those used on refrigeration units (not shown). The equipment compartment lids 19 preferably provide locked access for lift control and equipment maintenance.

Referring to FIGS. 2-6, the cabinet 10 of the present invention preferably includes a rack 30 mounted inside the enclosure 11 to place telecommunications equipment in the enclosure 11 and to allow easy access by maintenance personnel when repairs are needed. The rack 30 includes four (4) generally vertically positioned posts 31 and bottom horizontally disposed frame member 33, coupled to the posts 31, and an equipment platform 32 coupled to the posts 31 and disposed above the bottom frame member 33. A transceiver or radio cabinet 50 and equipment brackets 51, comprising battery backup and charger 52 and control and load panels and main disconnect switch 53 and the like mounted thereto, are preferably mounted on the platform 32. The lid 24 is preferably coupled to the posts 31. The posts 31, cross-members 33, platform 32 and lid 24 are preferably sized such that the outer extremities of the rack 30 are positioned closely adjacent to the inner walls of the cabinet 10. Four (4) guide rails or posts 35 are preferably positioned within the cabinet 10 adjacent the interior walls and the corner posts 31 of the rack 30 to guide the vertical ascent and descent of the rack into and out of the cabinet 10.

As shown in FIGS. 4 and 5, the cabinet 10 preferably includes a scissor-like lift mechanism 40 to raise and lower the rack 30. The lift mechanism is operably and releasably couplable to the bottom frame member 33 of the rack 30 and is preferably motorized, but may, in the alternative, be spring loaded. The spring force would be sufficient to cause a fully loaded unrestrained rack 30 to rise out of the enclosure 11 as shown in FIG. 5. The spring force is preferably 25 to 50 pound greater than a fully loaded rack 20, thus requiring a maintenance worker to apply 25 to 50 pounds of offset downward force to position the rack 30 and electronic equipment in the enclosure 11. If motorized, controls (not shown) would be provided to expand (see FIG. 5) and contract (see FIG. 4) the lift mechanism 40 to raise or lower the rack 30.

In an alternative embodiment, a pulley and weight system, as described in U.S. patent application Ser. No. 09/614,496, which is incorporated herein by reference, may be substituted for the lift mechanism 40. The weights are of sufficient weight such that a fully loaded unrestrained rack 30 is caused to rise out of the enclosure 11. An offset force of 25 to 50 pounds is necessary to reposition the rack 30 in the enclosure 11.

As shown in FIGS. 2 and 4-6, rack stops 42 are provided within the enclosure 11 to position the rack 30 within the enclosure. Rack arms 44 are coupled to the bottom frame member 33 and are sized and positioned to abut the rack stops 42 to limit the upward and downward travel of the rack 30.

Referring to FIGS. 4-6, the cabinet 10 includes a water evacuation system which is capable of venting any pooled water from the bottom of cabinet 10. The evacuation system includes several float-type sump pump 60 located in the bottom of the cabinet 10. A piping system (not shown) extends from the pumps 60 to exhaust valves 25 mounted to the vent compartment lids 17 shown in FIGS. 1 and 2. The exhaust valves 25 are commonly known one-way, pressure-type check valve.

Although the construction of the cabinet 10 advantageously allows the surrounding earth to aid in the dissipation of heat from the cabinet 10, this cooling effect may be insufficient in certain climate conditions or as a result of equipment power consumption. A reduction in humidity or condensation within the cabinet may also be desirable for increased component life even when the temperature within the cabinet is being maintained at a desirable level, i.e., at or below about 100° Fahrenheit. To accommodate these potential cooling requirements, the cabinet 10, as shown in FIGS. 4-9, includes a cooling system that preferably comprises separate cooling or vent compartments 17, each sharing a common wall 14 with the radio or main equipment compartment 16.

The cooling compartments 17 comprises a lid or top panel 18 and an opening or cooling vent 70 in the common wall 14, preferably positioned toward the top of the common wall 14 to allow hot air and moisture to vent from the main compartment 16 to the cooling compartments 17. The cooling compartment 17 has air vents 26 in the top panel 23, exposed to surface air. The vents 26 are preferably louvered so that rain or water entering the cooling compartment 17 cannot fall through the opening 70 in the common wall 14.

Figure 7:
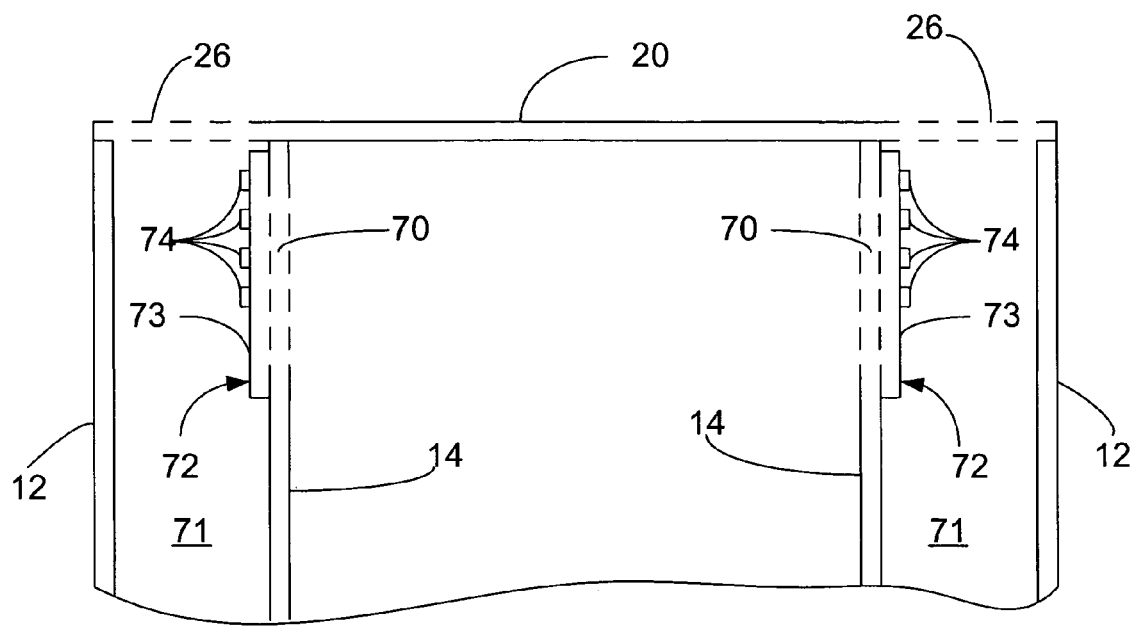
FIG. 7 is a partial side view of the interior of the vault and cooling system.
Figure 8:
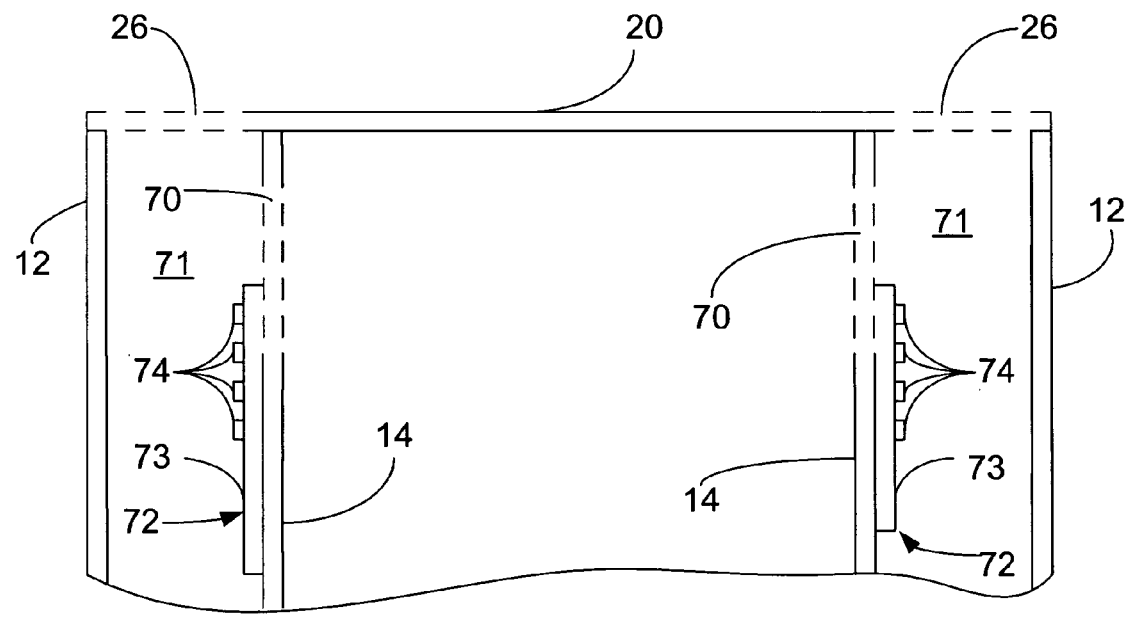
FIG. 8 is a side view of the interior of the vault showing the and cooling system.
Figure 9:
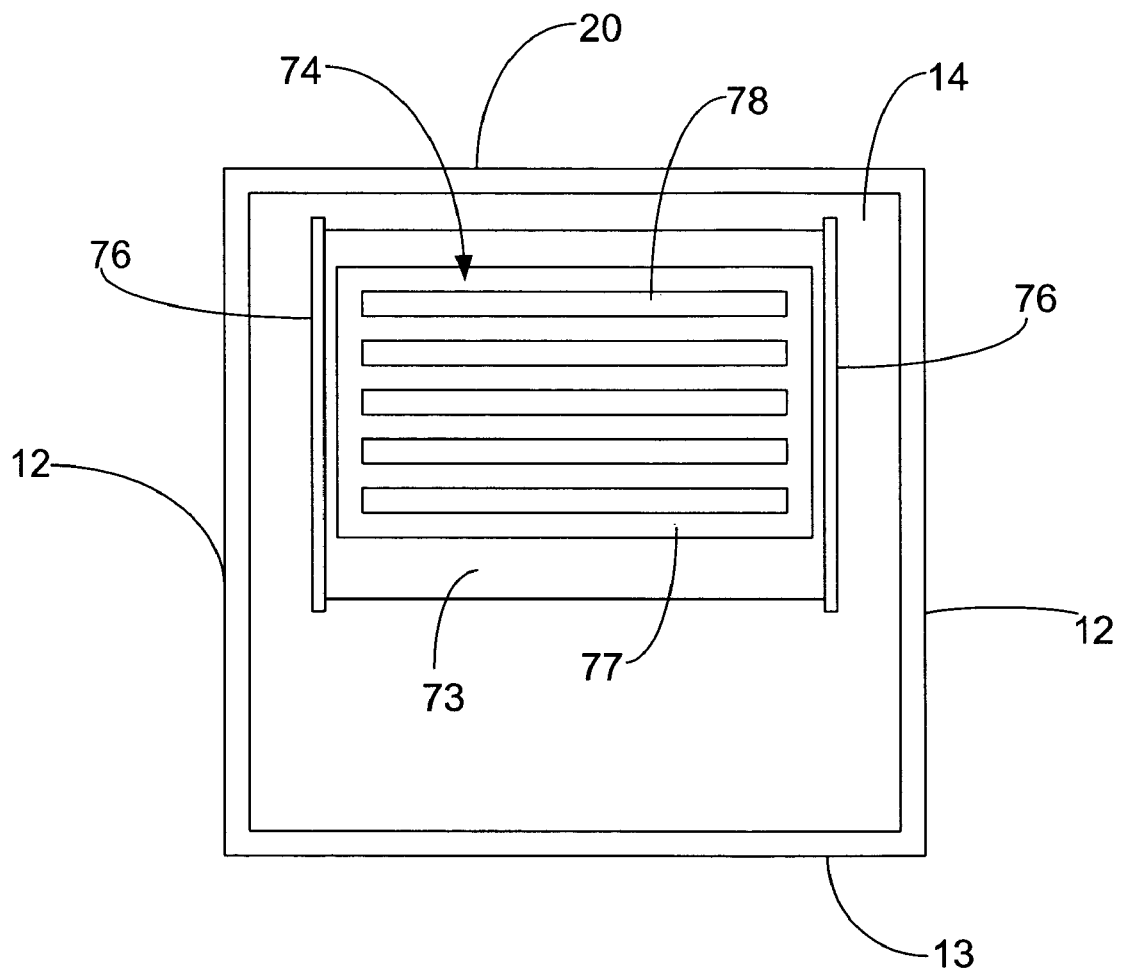
FIG. 9 is a plain view of closure device of the cooling system.

Should rain or other water enter the interior 71 of the cooling compartment 17 such that it rises to the level of the cooling vent 70, a closure system 72, as depicted in FIGS. 7 and 8, is provided to seal the cooling vent 70. The closure system 72 preferably comprises a door 73 and a flotation device 74. The door 73 is mounted in moveable relation with the common wall 14 and is adapted to seal the cooling vent 70 in the common wall 14. As shown in FIG. 9, the door 73 is slidably mounted within a pair of opposing tracks or guides 76. The tracks 76 are mounted on the common wall 14 and run vertically adjacent to the sides of the cooling vent 70 in the common wall 14. The tracks 76 preferably extend from the top of the cooling vent opening 70 toward the bottom of the cooling compartment 17 beyond the bottom of the opening 70. As shown in FIGS. 7 and 8, the door 73 slides or travels up from the bottom of the cooling compartment 17 to completely seal the opening 70 in the common wall 14 as the water level in the interior 71 of the compartment 17 rises.

The flotation device 74 comprises a floatable pad 77 attached to the door 73 on the inside 71 of the cooling compartment 17. Preferably, the pad 77 is formed from Styrofoam, but may be formed from other suitable material or may comprise an inflatable bladder. The pad 77 is substantially the same height and width as the door 73 and approximately one-inch thick, and preferably has a buoyancy value sufficient to raise the door 73 as water fills the compartment 17. To increase the surface area and, thus, the buoyancy of the pad 77, a series of channels or cutouts 78 are formed in the pad 77. If water floods the cooling compartment 17, the door 73 simultaneous rises as the water level rises in the interior 71 of the cooling compartment 17. With the aid of the water forcing the door 73 against the common wall 14, the door 73 forms a water tight seal between the main compartment 16 and the cooling compartment 17. However, in the absence of rain or flooding, the door 73 is open, allowing venting of heat and moisture from the cabinet 10.

In an alternative embodiment, the closure mechanism 70 may include a float and pulley system (not shown) adapted to raise the door 73 as the water level in the cooling compartment 17 rises. Also, a gasket or the like may be positioned between the door 73 and the common wall 14 to further facilitate a water tight seal between the main compartment 16 and the cooling compartment 17.

Unlike conventional designs, the vault or cabinet 10 of the present invention can be placed in virtually any city, near any existing vertical structure, e.g., a light standard, which is mounted on or near a sidewalk, while being fully disguised, and tending to pose no hazards to pedestrians, who might otherwise trip on an exposed unit.

The cabinet 10 of the present invention also advantageously includes an equipment flood evacuation system to prevent the expensive and sensitive telecommunication and other electronic equipment housed in the main equipment compartment 16 from becoming submerged and, thus likely destroyed, if the main compartment 16 of the cabinet 10 were to flood with water. The evacuation system preferably includes a flotation device 80 coupled to the rack 30 to raise the rack 30 as the water level within the main compartment 16 rises. Preferably, the evacuation system is configured to lift the telecommunication and other electronic equipment (50-53) clear out of the main compartment 16 while leaving a portion of the rack 30 within the compartment.

As depicted in FIGS. 4-6, the rack flotation device preferably comprises a floatable pad or block 80 disposed between the equipment platform 32 and the bottom frame member 33 of the rack 30. Preferably, the block 80 is formed from Styrofoam, but may be formed from other suitable material or may comprise an inflatable bladder. The block 80 preferably has a buoyancy value sufficient to raise a fully loaded rack 30 as water fills the compartment 16. To increase the surface area and, thus, the buoyancy of the block 80, a series of channels or cutouts (not shown) similar to those discussed in regard to the pad 77 above may be formed in the block.

In operation, if water floods the main compartment 16, the rack 30 simultaneous rises as the water level rises in the interior of the main compartment 16. With the lid 24 of the cabinet 10 fixed to the rack 30, the rack 30 can freely rise out of the cabinet 10 without human intervention with aid of the water forcing the rack 30 upward. As with the lift mechanism 40, the ascent of the rack 30 is guided by the guide rails 35 and limited by the rack stops and arms 42 and 44. However, in the absence of flooding, the rack 30 remains within the main compartment 16 with the lid 24 pressing against the gasket 22 to form a water tight seal between the exterior of the cabinet 10 and the main compartment 16. In order to insure a water tight seal, the gasket 22 is preferably about three to six (3 to 6) inches wide.

In an alternative embodiment, the evacuation system may include a float and pulley system (not shown) adapted to raise the rack as the water level in the main compartment 16 rises.

Figure 10:
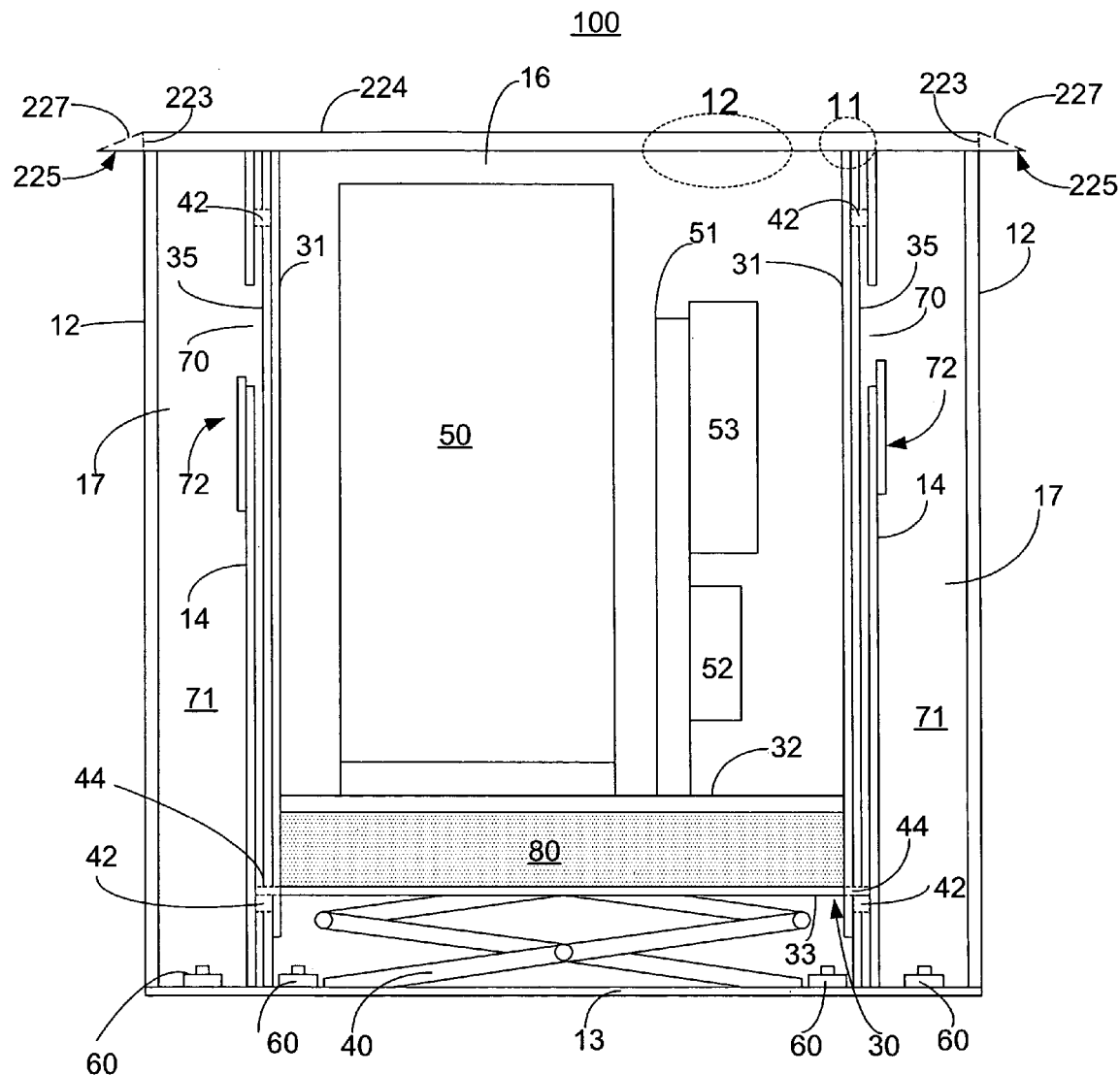
FIG. 10 is a side view of the interior of the vault with the equipment rack in a lowered position and having an alternative lid embodiment.
Figure 11:
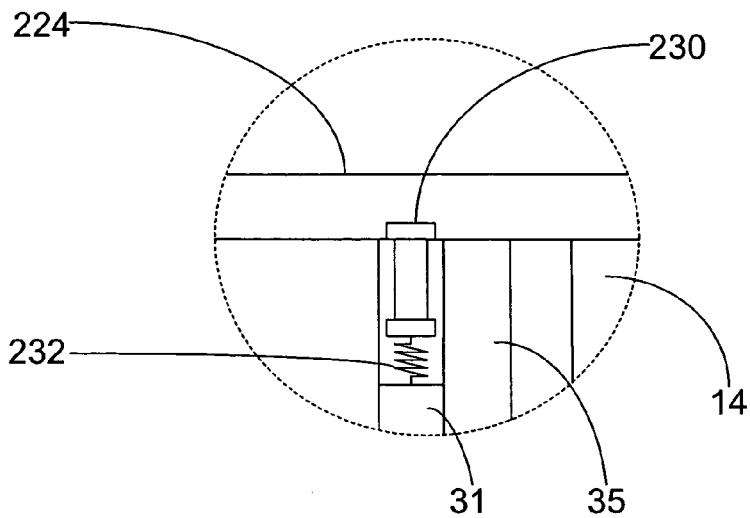
FIG. 11 is a detail view taken along line 11 in FIG. 10 showing the coupling of a break-away lid spring coupled to the equipment frame.

Turning to FIGS. 10 and 11, an alternative embodiment of the vault 100 is depicted. As shown in FIG. 11, a break-away lid 224 is releasably coupled to the equipment rack 30 allowing the lid 224 to give in the case of contact with something such as someone's foot or hand. Preferably, the break-away lid 224 is attached to the equipment rack 30 with a spring loaded coupling comprising a bolt or other fastener 230 coupled to the lid 224 and a spring 232 coupled to the bolt 230 and rack post 31. One skilled in the art would recognize that the bolt 230 could be coupled to the post 31 and the spring could be coupled to the bolt 230 and the lid 224. As depicted in FIG. 11, the bolt 230 and spring 232 assembly are preferably recessed within the post 31.

The springs 232 are preferably sized to counter weigh the weight of the lid 224. For instance, if the lid 232 weighed 200 lbs., the springs 232 would exert a 200 lbs. counter force against the lid 224.

Figure 12:
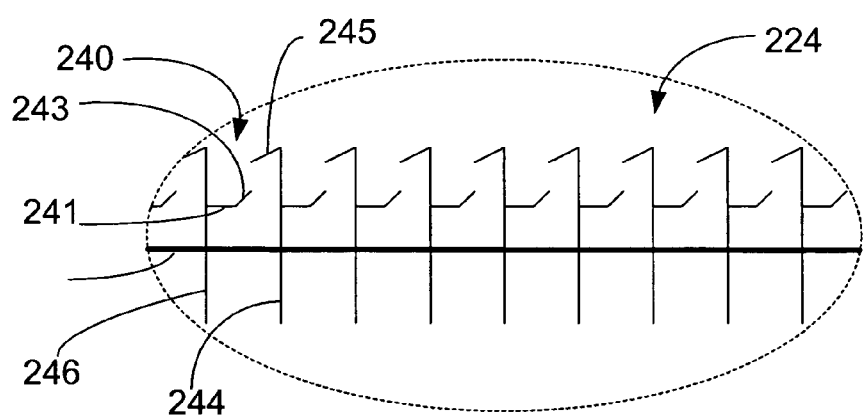
FIG. 12 is a detail view taken along line 12 in FIG. 10 showing the grated lid.
Figure 13:
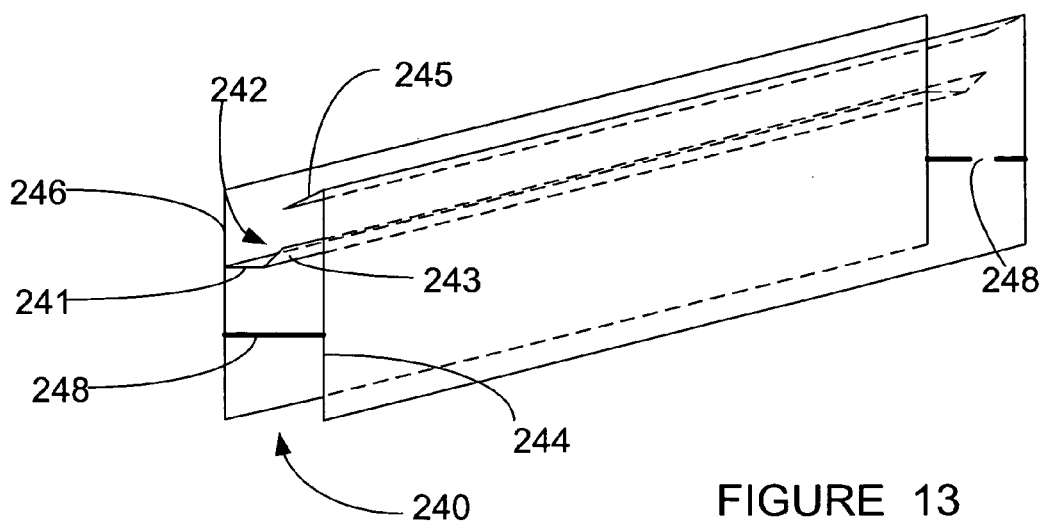
FIG. 13 is an isometric view of a single vent or slot of the grated lid shown in FIG. 12.

As depicted in FIGS. 10 and 12-13, another alternative embodiment of the vault 100 includes a grated lid or top 224 to control heat management of the vault 100 without having to use external or internal cooling systems. The grated lid 224 prevents rain or other water from failing directly into the main chamber 16 and allows air to flow into vault vent chambers 17 and out of the main equipment chamber 16 due to a chimney effect to maintain electronic equipment housed in the vault 100 at its ambient air temperature. To increase the chimney effect, it may be preferable to lower the location of the cooling vents 70 in the common walls 14.

Preferably, the grated lid 224 includes a plurality of elongate vents or slots 240 extending the width of the lid 224. Each slot is defined by a pair of vertical walls 244 and 246 and includes a diverter or sloping wall 245 extending off of the first wall 244 and sloping towards the second wall. The diverter 245 diverts water into a gutter or channel 242 extending off of the second wall. The gutter is preferably sloped towards one side of the lid 224 and channels the water toward a sloped faced vault skirt 225 and out or off of the lid 224. The gutter 242 includes a generally horizontal bottom wall 241 and an upwardly sloping side or retaining wall 243 directed toward the first wall 244 of the vent 240. Alternatively, the gutter 242 may comprise a single curved wall. A slotted plate or connective member 248 is coupled to all of the vertical walls 244 and 246 to form the grated lid 224.

As shown in FIG. 10, the vault 100 preferably includes a skirt 225 located substantially at grade level. The skirt 225 preferably includes a sloped face 227 to ease transition from grade level to a slightly elevated lid 224. In the grated lid embodiment, the sloped face 227 and internal wall 223 are preferably perforated to allow water channeled from the gutter 242 of the grated lid 224 to flow off or out of the lid 224.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A cabinet for underground storage of electronic equipment, comprising:
   an enclosure having a separate main compartment;
   a plurality of vertically oriented guide rails positioned within the cabinet;
   an equipment rack positioned within the enclosure having rack posts positioned adjacent to respective guide rails, wherein said guide rails guide the vertical ascent and descent of the rack into and out of the cabinet; and
   a flotation device coupled to the rack wherein said flotation device raises the equipment rack as the water level within the main compartment rises.

2. The cabinet of claim 1 wherein the flotation device is a block of floatable material.

3. The cabinet of claim 2 wherein the floatable material is Styrofoam.

4. The cabinet of claim 1 wherein the flotation device comprises an inflatable bladder.

5. The cabinet of claim 2 wherein the block includes a plurality of cutouts formed therein.

6. The cabinet of claim 1 wherein the flotation device comprises a float coupled to the rack through a pulley system.

7. The cabinet of claim 1 further comprising a lid coupled to the rack.

8. The cabinet of claim 7 further comprising a seal operably coupled to the enclosure and lid.

9. The cabinet of claim 1 further comprising interior walls which divide the interior of the enclosure into said main compartment and a vent compartment.

10. The cabinet of claim 1 further comprising a rack stop operably coupled to the rack.

11. The cabinet of claim 10 further comprising a lever arm adapted to abut the rack stop.

12. The cabinet of claim 7 wherein the lid releasably coupled to the rack.

13. The cabinet of claim 7 wherein the lid coupled through a spring loaded coupling to the rack.

14. The cabinet of claim 7 wherein the lid comprises a plurality of diverters operably couple to a plurality of gutters.

15. A cabinet for underground storage of electronic equipment, comprising an enclosure, a separate radio equipment compartment within the enclosure, and a flood evacuation system mounted within the enclosure to lift electronic radio equipment within the radio equipment compartment out of the enclosure, wherein said flood evacuation system raises the equipment rack as the water level within the radio equipment compartment rises and wherein the flood evacuation system includes means to stabilize the equipment rack as the equipment rack is raised.

16. The cabinet of claim 15 wherein the flood evacuation system comprises an equipment rack mounted within the enclosure, and a flotation device coupled to the rack.

17. The cabinet of claim 16 wherein the flotation device is a block of floatable material.

18. The cabinet of claim 17 wherein the floatable material is Styrofoam.

19. The cabinet of claim 16 wherein the flotation device comprises an inflatable bladder.

20. The cabinet of claim 17 wherein the block includes a plurality of cutouts formed therein.

21. The cabinet of claim 16 wherein the flotation device comprises a float coupled to the rack through a pulley system.

22. The cabinet of claim 16 further comprising a lid coupled to the rack.

23. The cabinet of claim 22 further comprising a seal operably coupled to the enclosure and lid.

24. The cabinet of claim 16 further comprising a plurality of guide rails operably coupled to the rack.

25. The cabinet of claim 16 further comprising a rack stop operably coupled to the rack.

26. The cabinet of claim 25 further comprising a lever arm adapted to abut the rack stop.

27. The cabinet of claim 22 wherein the lid releasably coupled to the rack.

28. The cabinet of claim 22 wherein the lid coupled through a spring loaded coupling to the rack.

29. The cabinet of claim 22 wherein the lid comprises a plurality of diverters operably couple to a plurality of gutters.

30. A transceiver station comprising a vertical structure, an antenna mounted atop of the vertical structure, a cabinet having an enclosure including a separate main compartment housing transceiver circuitry in electrical communication with the antenna, and a flood evacuation system mounted within the enclosure to lift electronic equipment out of the enclosure as the level within the main compartment rises.

31. The cabinet of claim 30 wherein the flood evacuation system comprises an equipment rack mounted within the enclosure, and a flotation device coupled to the rack.

32. The cabinet of claim 31 wherein the flotation device is a block of floatable material.

33. The cabinet of claim 32 wherein the floatable material is Styrofoam.

34. The cabinet of claim 31 wherein the flotation device comprises an inflatable bladder.

35. The cabinet of claim 32 wherein the block includes a plurality of cutouts formed therein.

36. The cabinet of claim 31 wherein the flotation device comprises a float coupled to the rack through a pulley system.

37. The cabinet of claim 31 further comprising a lid coupled to the rack.

38. The cabinet of claim 37 further comprising a seal operably coupled to the enclosure and lid.

39. The cabinet of claim 31 further comprising a plurality of guide rails operably coupled to the rack.

40. The cabinet of claim 31 further comprising a rack stop operably coupled to the rack.

41. The cabinet of claim 40 further comprising a lever arm adapted to abut the rack stop.

42. The cabinet of claim 37 wherein the lid releasably coupled to the rack.

43. The cabinet of claim 37 wherein the lid coupled through a spring loaded coupling to the rack.

44. The cabinet of claim 37 wherein the lid comprises a plurality of diverters operably couple to a plurality of gutters.

* * * * *